UNITED STATES PATENT OFFICE.

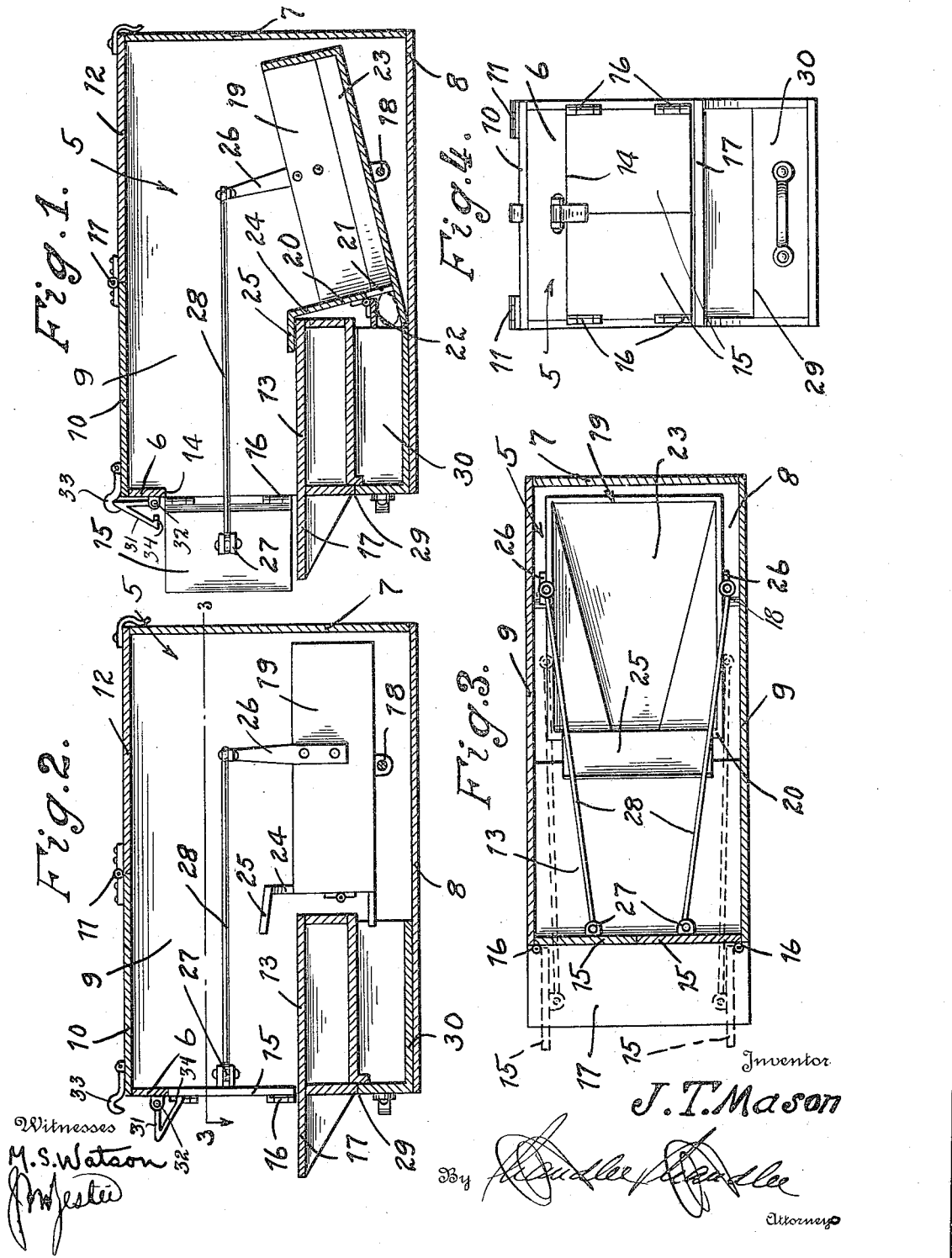
J. T. MASON.
AUTOMATIC NEST BOX.
APPLICATION FILED JULY 13, 1914.
1,153,808.
Patented Sept. 14, 1915.

JOHN T. MASON, OF KEWANEE, ILLINOIS.

AUTOMATIC NEST-BOX.

1,153,808.　　　　Specification of Letters Patent.　　Patented Sept. 14, 1915.

Application filed July 13, 1914. Serial No. 850,703.

*To all whom it may concern:*

Be it known that I, JOHN T. MASON, a citizen of the United States, residing at Kewanee, in the county of Henry, State of Illinois, have invented certain new and useful Improvements in Automatic Nest-Boxes; and I do hereby declare the following to be a full, clear, and exact description of the invention, such as will enable others skilled in the art to which it appertains to make and use the same.

This invention relates to devices for poultry, particularly to nest boxes, and has for its object the provision of a box having a nest therein which is adapted when occupied by a hen to automatically close the doors of the box so as to prevent intrusion of another hen, the doors being automatically re-opened when the hen leaves the nest.

An important object is the provision of a nest box of this character which is adapted to discharge the egg into a drawer or receptacle as soon as it is laid thereby preventing it from being trampled upon and broken by the next hen entering the nest.

Another object is the provision of a device of this character which will be simple in construction, inexpensive in manufacture, positive in operation and not likely to get out of order.

Other objects and advantages such as the general improvement of the art, will be carefully brought out in the following description and illustrated in the accompanying drawing, in which—

Figure 1 is a vertical longitudinal sectional view through my novel nest box showing it open. Fig. 2 is a similar view showing it closed. Fig. 3 is a horizontal sectional view taken on the line 3—3 of Fig. 2, and Fig. 4 is a front end view.

Referring more particularly to the drawing, the numeral 5 designates a preferably rectangular box formed of any suitable material, preferably galvanized iron. The box 5 comprises a front 6, back 7, a bottom 8, side walls 9 and a top 10. The top 10 extends only part way along the box and has hinged thereto as shown at 11 a cover 12.

Secured across the front of the box is a horizontal partition 13 which is disposed at the bottom edge of an opening 14 in the front wall 6. The opening 14 is adapted to be closed by a pair of doors 15 hinged at 16 upon the sides of the opening. Externally upon the end wall 6 is a plate 17, serving as a step for a hen to enable her to pass through the opening 14 and onto the partition 13.

Secured within and extending transversely through the box 5 adjacent its bottom 8 is a rod 18 upon which is secured for rocking movement a nest 19 which has its front wall 20 provided with an opening 21 closed by a swinging door 22 and which has its bottom 23 formed curved to form a channel converging toward the opening 21. Secured upon the front 20 of the nest is a plate 24 bent at its upper end to form a step 25 disposed practically upon the partition 13 when the device is in its normal or open position. When the device is in such normal position, the nest 19 is tilted forwardly and the doors 15 are open, as shown in Fig. 1. In order that rearward rocking movement of the nest may close the doors 15, I provide uprights 26 secured upon the sides of the nest 19 and suitably connected with the doors 15 as shown at 27 by connecting rods 28.

When a hen desires to enter the device, she steps or flies up onto the step 17, passes through the opening 14, on to the partition 13 and steps into the nest 19. The nest is so pivoted upon the rod 18 that the weight of a hen will over-balance the nest and cause it to rock backwardly, whereupon the arms 26 will be carried backwardly and the connecting rods 28 will pull the doors 15 shut. When the hen has finished laying and desires to leave the nest, she will step upon the step 25, thereby rocking the nest 19 forwardly. The hen will then walk over the partition 13 and out through the opening 14 as the doors 15 are re-opened when she steps upon the step 25.

Extending through an opening 29 in the bottom of the end wall 6 is a drawer 30, open at its rear end which is adjacent the opening 21 in the nest 19. As the nest 19 is rocked forwardly when the hen leaves the nest, the egg will roll down the channeled bottom 23 of the nest and will pass through the opening 21, into the drawer 30, the door 22 swinging upwardly to permit the passage of the egg.

From the foregoing description and a study of the drawing it will be apparent that I have thus provided a simple and novel nest box which will automatically be closed by the entry of a hen thereinto and which will automatically open when the hen starts to leave. Furthermore it will be seen that the eggs are removed from the nest as soon as the hen leaves, thereby preventing them from being broken by the next hen or eaten if any of the hens should have the habit of breaking and eating eggs. It will also be noted that when my device is used a hen will be undisturbed by other hens while laying.

In order to adapt the device for use as a trap nest, I provide a locking member 31 pivoted as at 32 upon the front wall 6 and formed with an inclined surface as shown. When the device is used simply as a nest box, this locking member 31 is swung upwardly and engaged beneath the end of a pivoted keeper 33 mounted upon the top of the box. When it is desired to use the device as a trap nest, the keeper 33 is moved upwardly to allow the member 31 to swing outwardly into a horizontal position, as shown in Fig. 2. The doors 15 being open, and the locking member being thus released, when a hen enters the device and closes the doors, as previously described, the doors will engage the inclined surface of the locking member 31 and raise it until the doors have been entirely closed, after which the locking member 31 will swing downwardly again with the portion 34 engaging in front of both doors at the upper ends of their meeting edges and prevent the doors from being opened by the action of the hen within the device. The doors will remain closed until released by the operator. This construction permits of the checking of the eggs and enables a record to be kept of the laying qualities of each hen.

It will be readily understood that I reserve the right to make various changes in the form, construction and arrangement of parts without departing from the spirit of the invention or limiting the scope of the subjoined claim.

Having thus described my invention, I claim:

A device of the character described comprising a box, provided in one end with an opening, a pair of doors hinged upon said end and adapted to close said opening, a nest pivoted for rocking movement within said box, the bottom of said nest being provided with a channel leading to an opening in the forward end of the nest, a plate upon the front end of said nest and extending upwardly, a step upon the upper end of said plate, a horizontal partition within said box adjacent said opening and said step, a pair of uprights secured upon said nest, rods connecting said uprights with said doors, and an egg receiving drawer in said box and having its rear opened end disposed adjacent the open front end of said nest whereby an egg laid within said nest will roll forwardly into said drawer when said nest is tilted forwardly by the exit of a hen therefrom.

In testimony whereof, I affix my signature, in the presence of two witnesses.

JOHN T. MASON.

Witnesses:
JAMES N. CUMMINGS,
IRA BLAKE.

Copies of this patent may be obtained for five cents each, by addressing the "Commissioner of Patents, Washington, D. C."